Oct. 11, 1938.   C. S. CRICKMER ET AL   2,132,723
PACKING ELEMENT
Filed Nov. 5, 1936
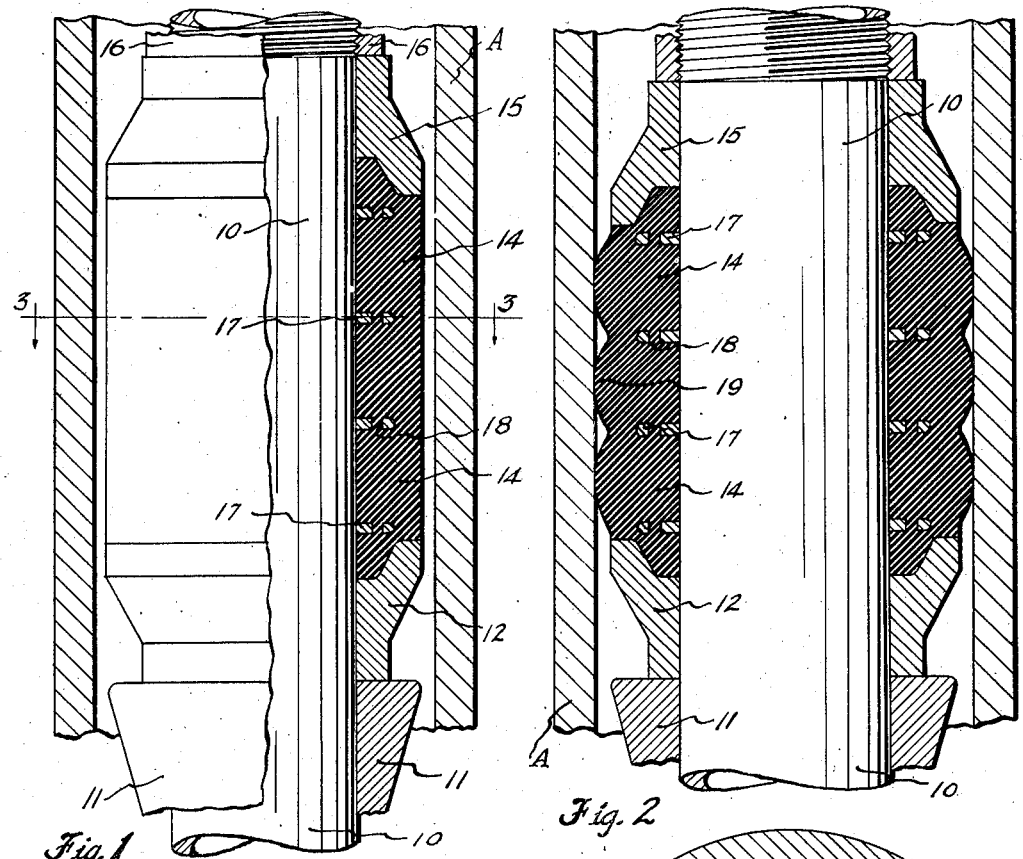
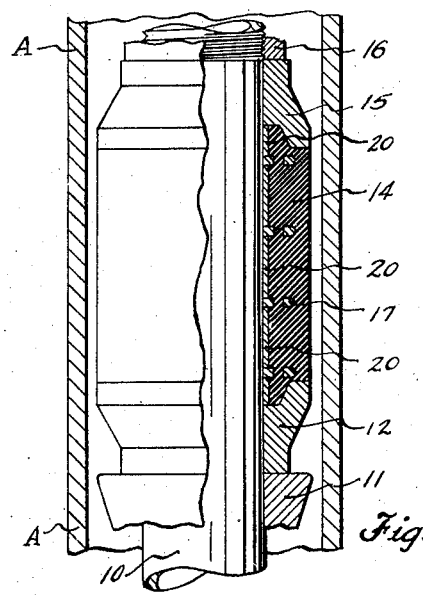
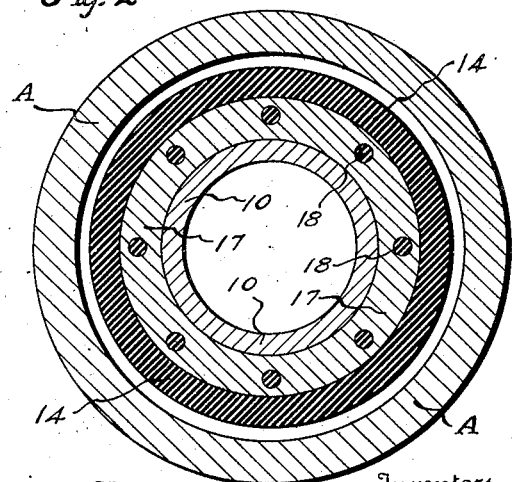
Inventors
CHARLES S. CRICKMER
ROY A. LAMB
By Jack A. Ashley
Attorney Patented Oct. 11, 1938

2,132,723

UNITED STATES PATENT OFFICE 2,132,723

PACKING ELEMENT

Charles S. Crickmer and Roy A. Lamb, Dallas, Tex., assignors to Merla Tool Company, Dallas, Tex., a firm Application November 5, 1936, Serial No. 109,264

1 Claim. (Cl. 166—10)

This invention relates to new and useful improvements in packing elements.

One object of the invention is to provide an improved packing element particularly adapted for use on a well packer, or other device, and arranged to effectively seal off the annular space between the well casing and tubing.

An important object of the invention is to provide an improved elongate packing element which is arranged to be distorted into sealing position in such manner as to produce the sealing effect of a plurality of superimposed packing rings, whereby the increased efficiency of a series of packing rings is obtained, while the strength and durability of a one piece packing member is retained.

A further object of the invention is to provide an improved elastic packing element which is provided with a plurality of reinforcing members molded, or otherwise secured therein, at spaced points throughout the length of the element, whereby when the element is distorted, the rings act to displace the outer periphery of the element into a series of superimposed bulges or protuberances, whereby the packing effect of a plurality of superimposed individual packing members is obtained.

Still another object of the invention is to provide an improved elastic packing element having means for anchoring the inner periphery thereof to a support, whereby when the element is distorted, its outer periphery will be displaced outwardly into sealing position without disengaging the element from its support; said means also acting to prevent distortion of the element beyond its elastic limit.

A further object of the invention is to provide an improved packing element having reinforcing members mounted therein in spaced relation throughout the length of the element, and suitable fabric or other flexible sleeves disposed on the inner periphery of the element between the reinforcing member, said sleeves acting as a binder to prevent undue splitting and cracking of the packing element.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in elevation and partly in section, of a packing element constructed in accordance with the invention, Figure 2 is a transverse, vertical, sectional view of the element in its distorted position, Figure 3 is a horizontal, cross-sectional view taken on the line 3—3 of Figure 1, and Figure 4 is a view, partly in section and partly in elevation, of a modified form of the invention.

In the drawing, the numeral 10 designates an elongate tubular mandrel which is adapted to be connected in a tubing string or other support (not shown), so as to be lowered therewith into a well casing A. The invention is applicable to any device, but for purposes of description it is shown as mounted on the mandrel of a well packer. The usual slip head 11 is slidable on the mandrel, and the usual gripping slips (not shown) are slidable on this head. When the slips are engaged with the wall of the casing, the head 11 is held stationary and the mandrel may slide therethrough. The slips have not been shown, as they form no part of the invention, and any suitable means may be employed for locking the head in a fixed position in the casing.

A supporting thimble 12 is slidably mounted on the mandrel 10 above the slip head 11, and rests upon the upper end thereof. The thimble is recessed at its upper end to form a peripheral flange 13. An elastic packing element 14, formed of rubber, Duprene, or any other suitable elastic material, surrounds the mandrel above the thimble 12 and has its reduced lower end disposed within the recess in the thimble and confined between the flange 13 and the mandrel. A flanged confining cap or inverted thimble 15 engages the reduced upper end of the packing element, whereby the element is mounted on the mandrel between the cap 15 and the thimble 12. A retaining collar 16 is secured to the mandrel above the confining cap 15 in some suitable manner, as by screw threads, whereby said cap is held in constant engagement with the upper end of the packing element.

A plurality of spaced metallic reinforcing rings 17 are molded, or otherwise suitably mounted, within the packing element, being disposed in a horizontal plane. Each ring encircles the mandrel and has its inner periphery engaging the mandrel, while its outer periphery terminates short of the outer periphery of the packing element. Each ring is flat and has a plurality of perforations 18 extending entirely therethrough, and it is obvious that the material of which the packing element is constructed passes through these openings, whereby the ring is rigidly affixed within the element. Since the rings encircle the mandrel 10 it will be seen that they tend to hold the packing element in engagement with the mandrel.

When the device has been lowered into position within the well casing, with the packing element in its normal or undistorted position, as shown in Figure 1, the slips (not shown) are moved into gripping engagement with the wall of the casing, thereby holding the slip head 11 stationary. Since the thimble 12 is supported on the slip head, it will also remain stationary, while the mandrel 10, which is slidable through both the thimble 12 and the slip head 11, may move vertically. As the mandrel is moved downwardly, the retaining collar 16, being fixed to the mandrel, moves downwardly therewith and also moves the confining cap 15 downwardly.

The downward movement of the cap 15 toward the stationary thimble 12 distorts the packing element 14 therebetween, and since the metallic rings 17, molded within the element, are compressed therewith into closer proximity to each other, the element is distorted between each pair of rings into annular protuberances or bulges 19 (Figure 2). That portion of the element in the plane of each ring will be held in substantially its normal undistorted position by the ring because it is firmly affixed or molded to the ring. The distortion of the packing member causes the same to move into engagement with the wall of the well casing, whereby a seal is formed between said casing and the mandrel.

It is noted that the protuberances formed by distortion of the element have substantially the same sealing effect as a series of superimposed individual packing rings, yet the element is formed in a single piece and retains the strength and durability of a one piece packing element. It is further noted that, since the packing element is firmly affixed to the metallic rings 17, and extends through the openings 18 therein, said rings act to hold the element in engagement with the mandrel, whereby said element is prevented from being stripped off the mandrel. It is also noted that the provision of the spaced rings 17 within the element serves to reinforce the same throughout the length thereof, whereby the element is strengthened and made more rigid. Also, distortion of the element beyond the elastic limit of its material is substantially eliminated by the spaced rings, which retain those portions of the element secured thereto in a fixed position with relation to the mandrel.

A modified form of the invention is shown in Figure 4, wherein all the features of the packing element hereinbefore described are retained, and in addition flexible reinforcing sleeves 20, made of fabric or other suitable material, are suitably secured to the element. The sleeves may be vulcanized or otherwise fastened on the inner periphery of the packing element between the rings 17. Said sleeves encircle the mandrel in intimate contact therewith and serve to further anchor the packing element to the mandrel, and thereby aid in preventing said element from being stripped off the mandrel. However, instead of a plurality of sleeves, a single elongate sleeve extending throughout the bore of the packing element may be provided. The sleeves 20 not only tend to hold the element more firmly on the mandrel, but also prevent disintegration of said element in the event that the element cracks or splits.

It is noted that in either form, when the pressure exerted on the element is removed, said element will return to its normal undistorted position due to the inherent elasticity of its material. It is further noted that any suitable means for supporting and distorting the element may be used, as said means forms no part of the invention.

What we claim and desire to secure by Letters Patent, is:

A packing element including, an elongate annular body of elastic material having a plurality of equally spaced flat rigid metallic rings embedded therein throughout the length thereof and a sleeve of flexible reinforcing material lining its bore, the inner peripheries of said rings coinciding substantially with the periphery of the bore of said elastic body and the outer peripheries of the rings terminating short of the circumference of the body, whereby a continuous solid and unreinforced annular strip of the elastic body material is located outside the outer peripheries of the rings.

CHARLES S. CRICKMER.
ROY A. LAMB.